US007865862B2

(12) United States Patent
Chou et al.

(10) Patent No.: US 7,865,862 B2
(45) Date of Patent: *Jan. 4, 2011

(54) DESIGN STRUCTURE FOR DYNAMICALLY SELECTING COMPILED INSTRUCTIONS

(75) Inventors: Deanna J. Chou, Durham, NC (US); Jesse E. Craig, Burlington, VT (US); John Sargis, Jr., Essex, VT (US); Daneyand J. Singley, Williston, VT (US); Sebastian T. Ventrone, Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 505 days.

This patent is subject to a terminal disclaimer.

(21) Appl. No.: 11/937,106

(22) Filed: Nov. 8, 2007

(65) Prior Publication Data

US 2009/0125704 A1 May 14, 2009

(51) Int. Cl.
*G06F 17/50* (2006.01)
(52) U.S. Cl. .......................... 716/18; 712/214
(58) Field of Classification Search ................ 716/1, 716/16–18; 707/10; 703/22; 712/200, 207, 712/214; 717/106, 136, 140, 152, 153
See application file for complete search history.

(56) References Cited

U.S. PATENT DOCUMENTS

| 5,361,373 | A  | 11/1994 | Gilson |
| 5,430,734 | A  | 7/1995  | Gilson |
| 5,600,845 | A  | 2/1997  | Gilson |
| 5,752,035 | A  | 5/1998  | Trimberger |
| 6,230,307 | B1 | 5/2001  | Davis et al. |
| 6,590,942 | B1 | 7/2003  | Hessel et al. |
| 6,622,233 | B1 | 9/2003  | Gilson |
| 6,634,023 | B1 | 10/2003 | Komatsu et al. |
| 6,862,563 | B1 | 3/2005  | Hakewill et al. |
| 6,961,842 | B2 | 11/2005 | Baxter |
| 6,983,456 | B2 | 1/2006  | Poznanovic et al. |
| 7,028,107 | B2 | 4/2006  | Yorbach et al. |
| 7,051,185 | B2 | 5/2006  | Gilson |
| 7,127,616 | B2 | 10/2006 | Kaneko |
| 7,269,738 | B1 | 9/2007  | Kivimaki |
| 7,373,631 | B1 | 5/2008  | Yuan et al. |
| 7,389,487 | B1 | 6/2008  | Chan et al. |

(Continued)

OTHER PUBLICATIONS

"Dynamically Reconfigureable Computing: A Novel Computation Technology with Potential to Improve National Security Capabilities by Dramatically Improving High-End Computing", Ward et al., May 15, 2003.

(Continued)

*Primary Examiner*—Vuthe Siek
(74) *Attorney, Agent, or Firm*—Cantor Colburn LLP; Michael LeStrange

(57) ABSTRACT

A design structure embodied in a machine readable medium used in a design process includes an apparatus for dynamically selecting compiled instructions for execution, the apparatus including an input for receiving static instructions for execution on a first execution unit and receiving dynamic instructions for execution on a second execution unit; and an instruction selection element adapted to evaluate throughput performance of the static instructions and dynamic instructions based on current states of the execution units and select the static instructions or the dynamic instructions for execution at runtime on the first execution unit or the second execution unit, respectively, based on the throughput performance of the instructions.

6 Claims, 8 Drawing Sheets

U.S. PATENT DOCUMENTS

| | | | |
|---|---|---|---|
| 2001/0034876 | A1 | 10/2001 | Panchul et al. |
| 2004/0049653 | A1 | 3/2004 | Gilson |
| 2005/0120341 | A1 | 6/2005 | Blumenthal et al. |
| 2006/0236292 | A1 | 10/2006 | Delp et al. |
| 2008/0300851 | A1* | 12/2008 | Chakrabarti et al. .......... 703/22 |
| 2009/0031111 | A1* | 1/2009 | Chou et al. ................. 712/207 |

OTHER PUBLICATIONS

"Reconfigurable Processor Architectures", Ian Page, Oxford University Computing Laboratory.

"A Reconfigurable Computing Model for Biological Research Application of Smith-Waterman Analysis in Bacterial Genomes", Collaboration with National Cancer Institiute—Frederick and SAIC Frederick.

* cited by examiner

```
boolean stringMatch(String a, String b){
    if(a.length() !=b.length()) return false;
    boolean mismatch = false;
    for(int index = 0; (index < a.length()) && !(mismatch); ++index){
        mismatch = (a.charAt(index) !=b.charAt(index));
    }
    return !(mismatch);
}
```

ITERATIONS OF THIS LOOP ARE INDEPENDENT

*FIG. 3*

DESIGN STRUCTURE FOR DYNAMICALLY SELECTING COMPILED INSTRUCTIONS

CROSS-REFERENCE TO RELATED APPLICATIONS

This non-provisional U.S. Patent Application is co-pending with U.S. patent application Ser. 11/828,705, which was filed Jul. 26, 2007, and is assigned to the present assignee.

BACKGROUND

The present invention relates generally to compiled instructions and, more particularly, to a design structure for dynamically selecting compiled instructions for execution.

A compiler is a specialized computer program that converts source code written in one programming language into another language, usually machine language (also called machine code), so that it can be understood by processors (i.e., logic chips). Source code is the version of software (usually an application program or an operating system) as it is originally written (i.e., typed into a computer) by a human in plain text (i.e., human readable alphanumeric characters). Source code can be written in any of numerous programming languages, some of the most popular of which are C, C++, Java, Perl, PHP, Python and Tcl/Tk. The output of a compiler is referred to as object code.

Compilers create programs that are optimized to target the processors and the fixed functions of their architecture. However, the architecture may be tuned very well for one application type, but will penalize others. Current architectures are optimized around the most typical coding sequences, or worst, towards benchmarks used in market comparisons. As a result, the ability to create optimum performance for multiple instruction sequence types is too broad an endeavor for current architecture and compiler methods.

Previous architectures had a fixed structure. The performance of fixed architectures can be very restrictive with their static execution units. It is nearly impossible for a generalized fixed architecture to be ideal for all problems. Custom execution units are not ideal due to their limited usefulness, chip area and power consumption.

Dynamic compilation is a process used by some programming language implementations to gain performance during program execution. The best known language that uses this technique is Java. Dynamic compiling originated in Self. It allows optimizations to be made that can only be known at runtime. Runtime environments using dynamic compilation typically have programs run slowly for the first few minutes, and then after that, most of the compilation and recompilation are done and the program runs quickly. However, due to this initial performance lag, dynamic compilation is undesirable in certain cases. In most implementations of dynamic compilation, some optimizations that could be done at the initial compile time are delayed until further compilation at runtime, causing further unnecessary slowdowns.

Attempts have been made to improve dynamic compilation. For example, just in time compilers have been developed that compile from architecture independent code (Java Byte code) into architecture dependent application based solely on the history of execution at runtime. This type of compiling performs optimization based on the target architecture.

Tensilica compilers create custom logic based on application specific needs to solve a particular problem, like an Application Specific Integrated Circuit (ASIC). Software routines are mapped to hardware macros through a tool. This optimization yields higher performance but only for a fixed problem domain.

Transmeta compilers convert Intel x86 code into internal VLIW instruction architecture format, recompiling often used parts of the code for the best optimization. It then replaces the translated coded with optimized translated code based on historical usage patterns. Since the code is replaced, the previous code cannot be used when circumstances change, and the optimized code is no longer optimal.

Field Programmable Gate Arrays (FPGAs) have been used historically by hardware design engineers to design, validate, and test circuitry as an intermediate step, ultimately targeting the design for use in an ASIC, such as a custom digital signal processor (DSP) or other special purpose chips. ASICs are fast and highly specialized, and thus very efficient. However, they are very costly to bring to market, and thus are usually used in mass-market applications. For the past twenty years, text based hardware design languages (HDLs), such as VHDL and Verilog, have been used for designing, or programming such custom circuitry. FPGAs have had much slower clock speeds than processors, and thus were never originally intended for use as processing elements themselves.

Over the years, FPGAs have been catching up to processors, and have outstripped Moore's law, becoming much denser, faster, and cheaper at a much faster rate than microprocessors. In fact, today the majority of designs for custom circuitry can now remain on an FPGA for execution instead of going through the long and expensive process of bringing a custom ASIC to market.

Although the C based FPGA programming environments today can facilitate an application programmer inputting circuitry (Cores) into FPGAs by making simple redirected function calls to place these cores in the FPGA based hardware, they were never really designed as parallel hardware design languages for creating optimal cores. In particular, current C based FPGA programming techniques are not suited for creating complex designs. C and C++ were never actually designed to do parallel programming in reconfigurable FPGA hardware and mix them with hardware design languages, such as VHDL. Using current C based FPGA programming techniques to accomplish tasks that they were never designed to do can produce an awkward and challenging experience for programmers. These solutions are sufficient for placing cores and simple single chip designs into a single FPGA, but in order to maximize performance with larger parallelized applications in a deep-scaling environment (including, e.g., multiple FPGA designs, and multiple FPGA board to board designs), these tools will need to greatly evolve their capabilities.

With current compiler architecture, it is nearly impossible for a generalized fixed architecture to be ideal for all problems. Custom execution units are not ideal due to their limited usefulness, chip area, and power consumption. The choice of execution units would ideally be a dynamic choice that is based on the current state of the execution unit at the time of execution.

SUMMARY

The foregoing discussed drawbacks and deficiencies are overcome or alleviated, in an exemplary embodiment, by a design structure embodied in a machine readable medium used in a design process, the design structure including an apparatus for dynamically selecting compiled instructions for execution, the apparatus including an input for receiving static instructions for execution on a first execution unit and receiving dynamic instructions for execution on a second execution unit; and an instruction selection element adapted to evaluate throughput performance of the static instructions and dynamic instructions based on current states of the execution units and select the static instructions or the dynamic instructions for execution at runtime on the first execution unit or the second execution unit, respectively, based on the throughput performance of the instructions.

BRIEF DESCRIPTION OF THE DRAWINGS

Referring to the exemplary drawings wherein like elements are numbered alike in the several Figures:

FIG. 3 illustrates an exemplary code sequence for an instruction that may be performed by a dynamic execution unit according to an exemplary embodiment.

DETAILED DESCRIPTION

According to exemplary embodiments, execution units are chosen at runtime, depending on the state of the execution units. Thus, for example, a traditional processor may be chosen to execute traditional architecture-dependent instructions or another execution unit, e.g., an FPGA, a graphic processor, physics processor, etc., may be chosen to execute architecture-independent instructions. For ease of explanation, FPGAs are described below as alternatives for executing instructions. It should be understood, however, that other types of execution units, programmed with other architecture-independent instructions, may be used.

According to an exemplary embodiment, upon compiling, a set of instruction sequences is evaluated for the number of occurrences in the code, potential parallelization, and other criteria to determine a partioning of an integrated set of programmable execution units. A set of chosen code sequences is then converted to dedicated FPGA index pointers. A set of FPGA instructions are created to replace the substitute in-line execution instructions. A single merge program is the output with the set of standard instruction sequences and FPGA instructions. Upon execution, the prefetcher can detect the pre-compiled FPGA unit to use or execute the standard instructions.

Figure 1:
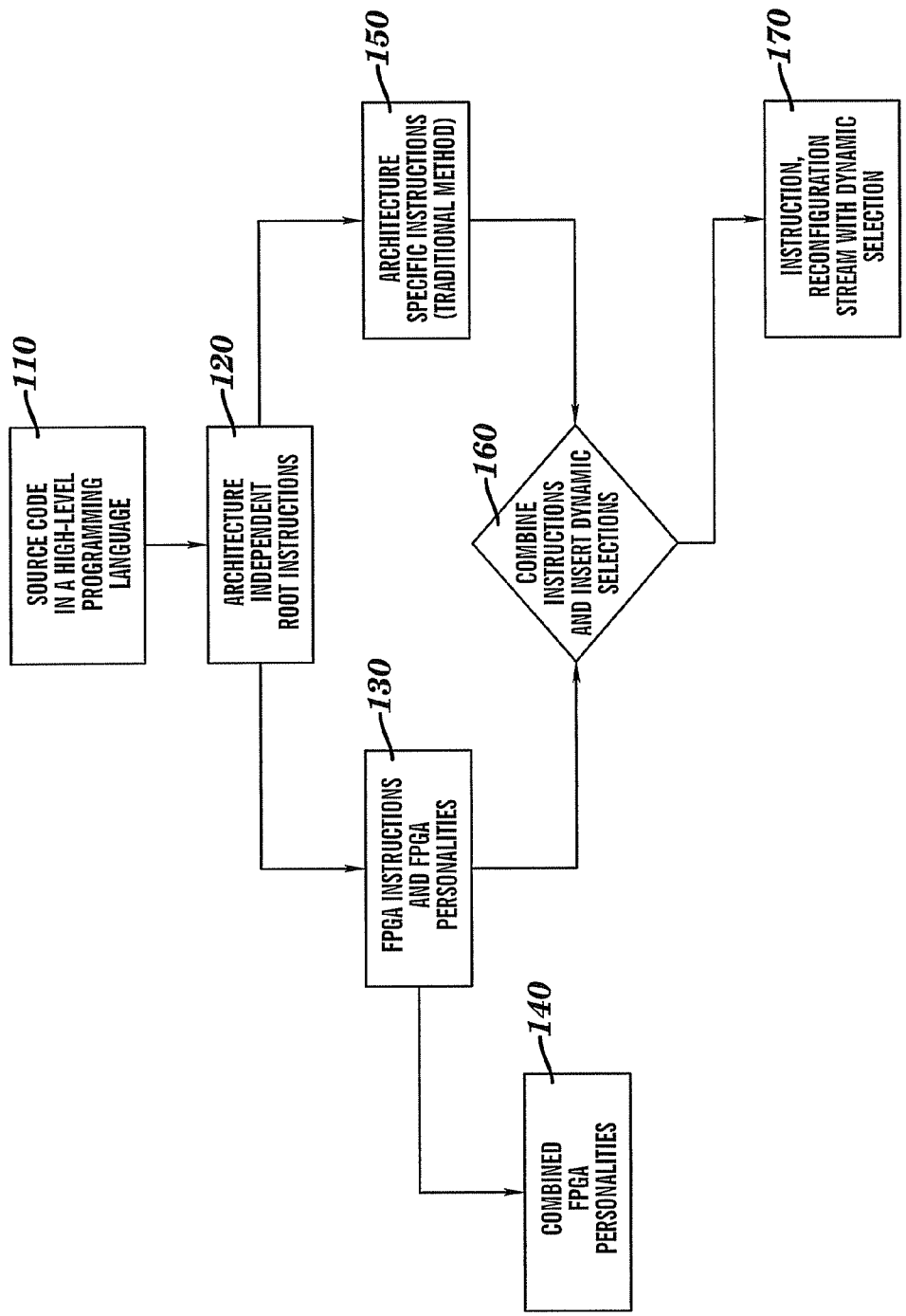
FIG. 1 is a flow diagram depicting a method for dynamic compilation according to an exemplary embodiment.

FIG. 1 is a flow diagram illustrating a method for dynamic compilation according to an exemplary embodiment. FIG. 1 shows a method of converting a sequence of instructions of a high level language into a partitioned set of instructions. This set is converted into a new hybrid FPGA marker instruction and FPGA personality, along with traditional in-line architecture instructions that are seamlessly integrated into a single instruction stream.

Referring to FIG. 1, the method begins at step 110 at which the source code is input in a high-level programming language. At step 120, architecture independent root instructions are generated. At step 130, FPGA instructions and FPGA personalities are generated. The FPGA "personalities" correspond to the configuration or the function of an FPGA, while the FPGA instructions indicate how to use the FPGA functions. For example, an FPGA function may be to multiply two integers, and an FPGA instruction may indicate what two integers to multiply. At step 140, combined FPGA personalities are created. These combined FPGA personalities may be stored for retrieval later, if needed. At step 150, architecture specific instructions are generated. At step 160, the FPGA instructions and FGPA personalities are combined with the architecture specific instructions, and dynamic selections are inserted. At step 170, an instruction is generated with a reconfiguration stream with dynamic selections.

Figure 2:
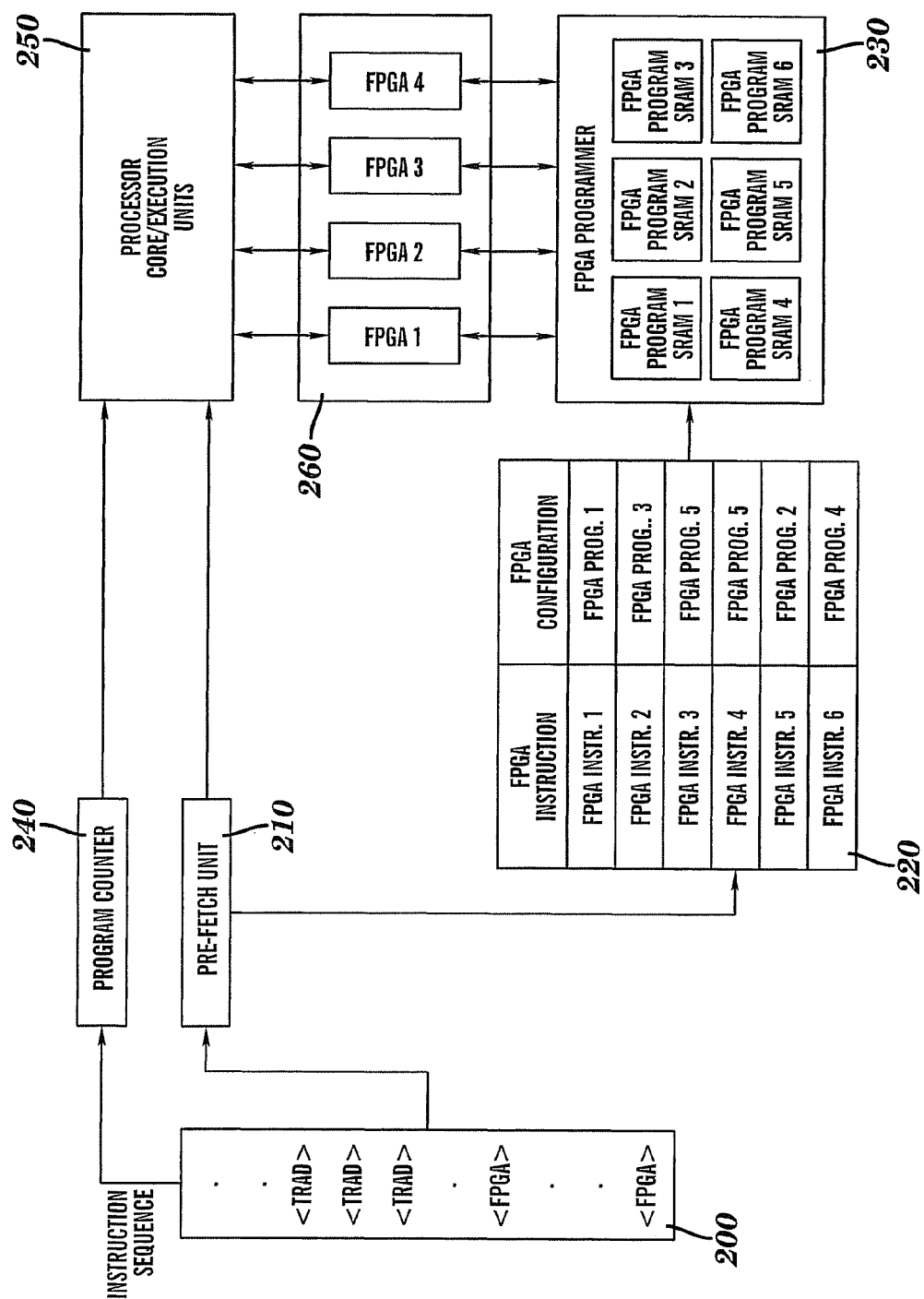
FIG. 2 illustrates dynamic instruction architecture according to an exemplary embodiment.

FIG. 2 illustrates exemplary dynamic instruction architecture. An instruction sequence stored in a cache 200 includes traditional, architecture-dependent instructions and non-traditional architecture-independent instructions, e.g., FPGA instructions. The instructions are fetched by a pre-fetch unit 210 and fed into an FPGA mapping unit 220 in which the FPGA instructions are mapped to FPGA programs for executing those instructions. The FPGA mapping unit 220 communicates with an FPGA programmer 230 to determine whether an FPGA program is stored in an SRAM for executing the function corresponding to the program. If the FPGA program is not stored in an SRAM, it may be retrieved from a file of combined FPGA personalities, as described above. Once the FPGA program is retrieved, it is loaded into an available FPGA in FPGA unit 260.

The program counter 240 fetches instructions to be performed by the processor core/execution units 250 or by the FPGA if the processor determines that this is appropriate. The program counter 240 keeps track of the instruction that is currently being executed, while the prefetcher unit fetches instructions before they are to be executed. The prefetcher unit 210 also feeds into the processor core/execution units 250. At runtime, the processor 250 makes a selection whether to use the FPGA unit to execute FPGA instructions or to execute the traditional instructions fed directly from the prefetcher 210. This selection maybe made by determining whether an FPGA is available, whether an FPGA is free, whether the instruction would be executed faster using an FPGA, etc. If the processor core 250 determines that an FPGA should execute the instructions, it directs an FPGA from FPGA unit 260 to execute the instructions and return the results. If the processor core 250 determines that it would be more optimal to execute the traditional instructions, the instructions are executed in the processor 250. Details of the steps involved in this selection process are provided below with reference to FIG. 5.

FIG. 3 illustrates an example of a code sequence for an instruction that may be suitable for execution by a dynamic execution unit, such an FPGA.

Figure 4:
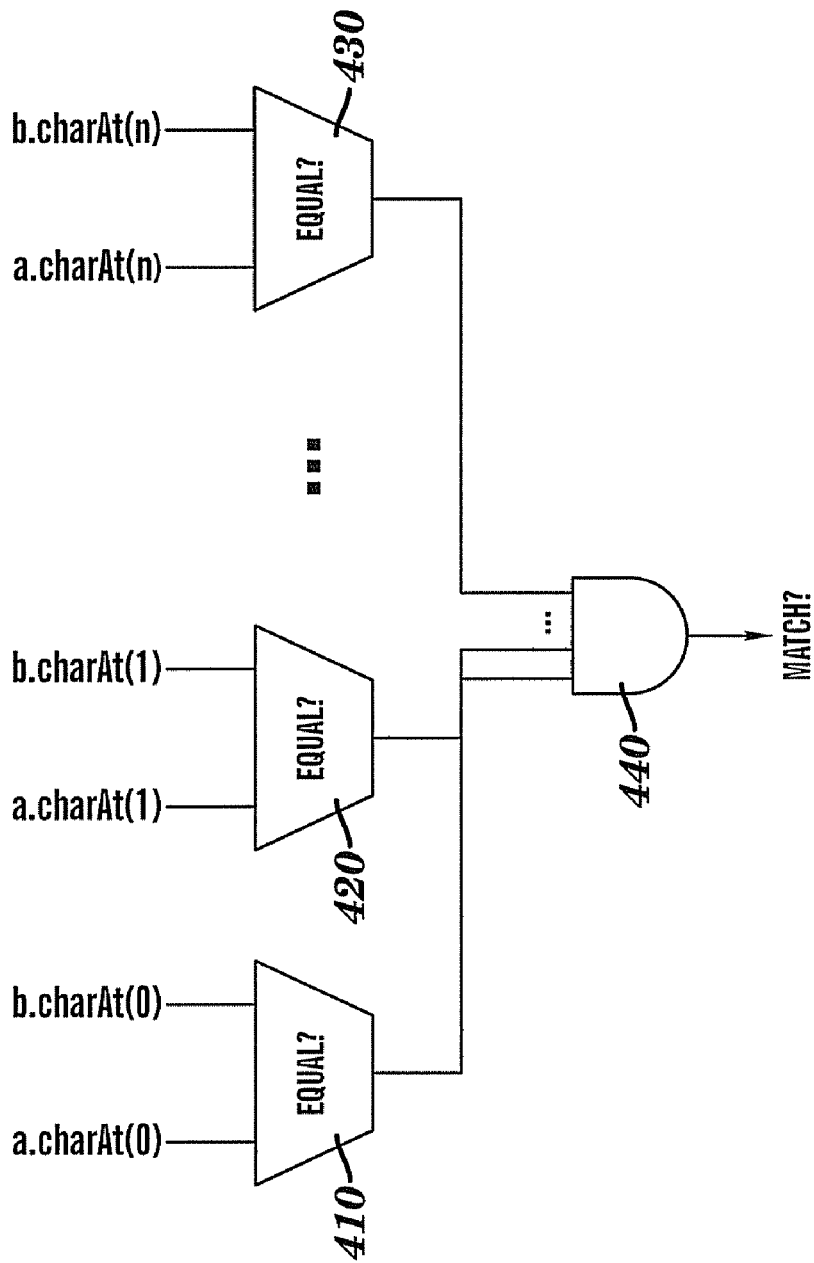
FIG. 4 illustrates a dynamic string matching example according to an exemplary embodiment.

FIG. 4 illustrates a dynamic string matching example. This process includes a set of string compare functions 410, 420, 430 that can be re-used for other similar string sequences in other code segments. It should be appreciated that although only three comparison units 410, 420, and 430 are shown, any number of comparison units may be used, depending upon the number of strings. According to this embodiment, multiple instruction sequences are read in parallel without any hits in bandwidth or performance, and the common instructions that can be referenced from the first time they are seen are pulled out via matching unit 440.

Figure 5:
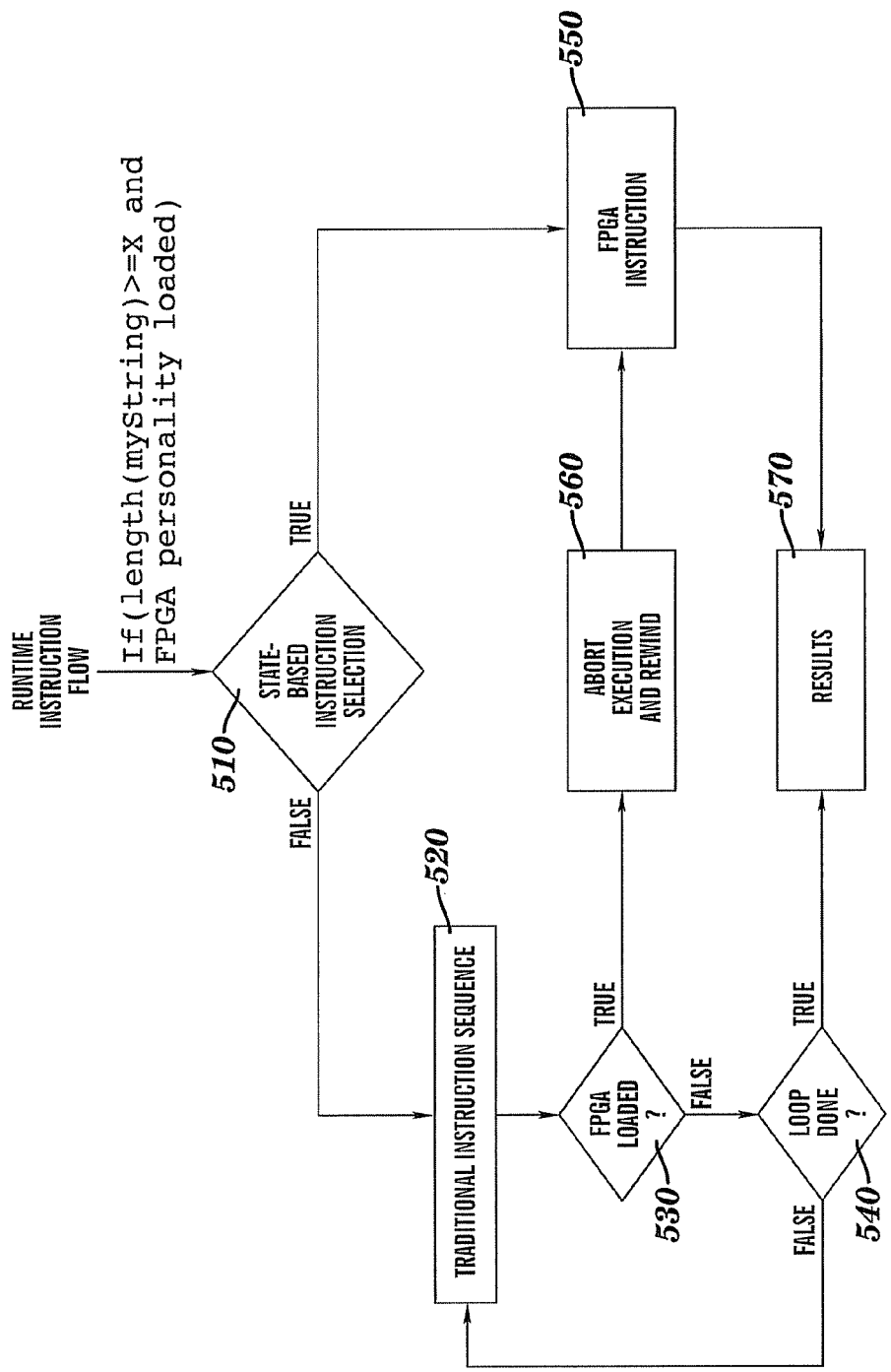
FIG. 5 illustrates a method for runtime instruction selection according to an exemplary embodiment.

FIG. 5 illustrates a method for selecting instructions at runtime according to an exemplary embodiment. The steps of this method may be performed, e.g., by software running in the processor 250 shown in FIG. 2. The selection of dynamic instructions versus standard (static) instructions takes into account the performance of each execution method. In the example shown in FIG. 5, selection is based upon string length and whether or not a dynamic execution has been built in time execute the instructions. A dispatcher in the processor 250 may distribute the instructions to the appropriate execution unit, based on upon the selection.

Referring to FIG. 5, the method begins with state-based instruction selection at step 510. During this step, a run-time instruction flow is analyzed, and a determination is made as to which instructions have the best throughput performance. In the example shown, this involves determining whether the length of the instruction, e.g., (length (my string)) is greater than or equal to a predetermined value X and a loaded FPGA personality. If so, the throughput performance is determined to be optimal for an FPGA instruction, and an FPGA instruction is selected at step 550. The execution results are provided at step 570. Otherwise, traditional (static) instructions are chosen to execute at run-time at step 520. A determination is made at step 530 whether an FPGA is loaded. This may occur when an FPGA is not loaded (built) in time for the instruction to be executed, but is finished being built before the traditional instructions are completed. In this rare case, the execution of the traditional instructions may be aborted at step 560, and the FPGA instruction may be chosen for execution instead at step 550. Otherwise, a determination is made at step 540 whether an instruction loop has been completed. If so, the execution results are produced at step 570. Otherwise, the process returns to step 520.

Figure 6:
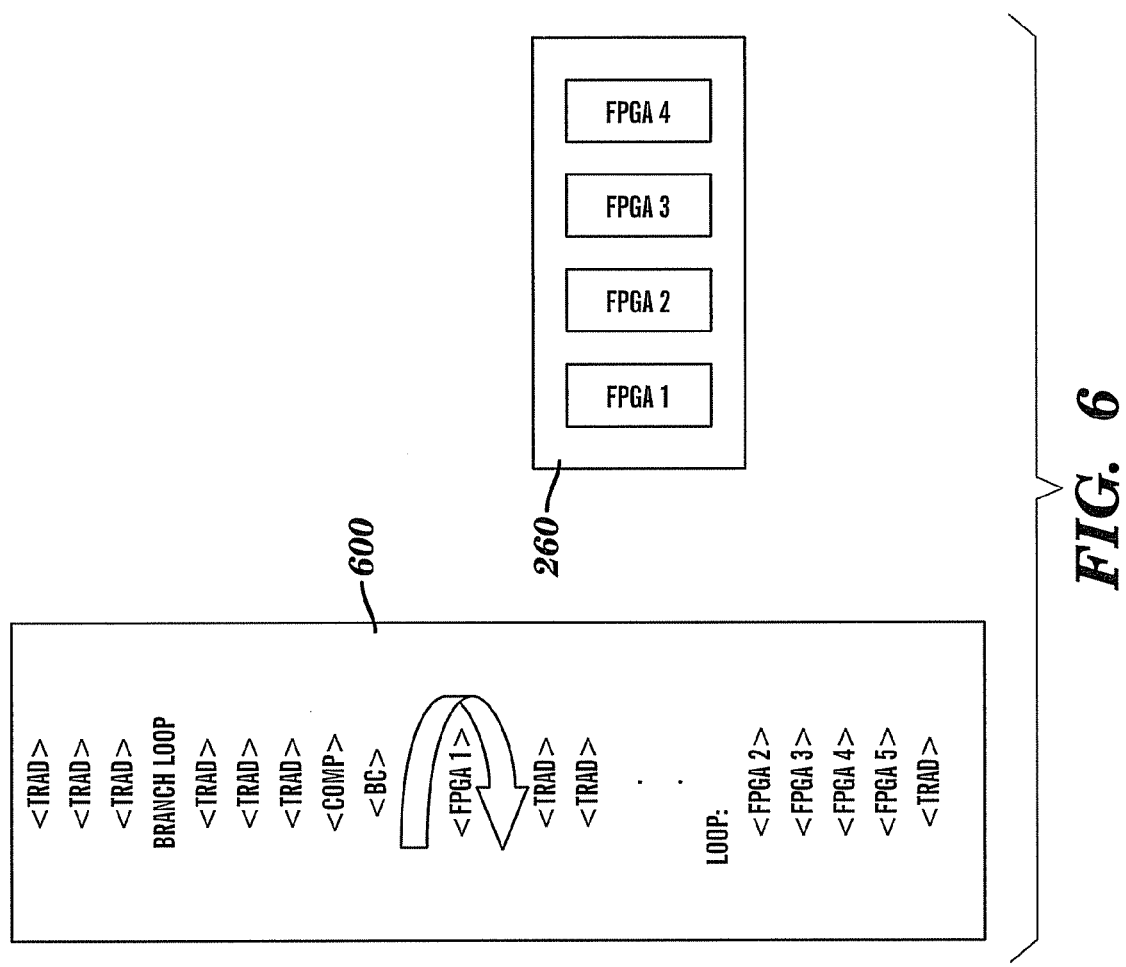
FIG. 6 illustrates an example of how special instructions within an instruction sequence may be handled according to an exemplary embodiment.

FIG. 6 illustrates an example how special instructions within an instruction sequence may be handled according to an exemplary embodiment. As shown in FIG. 6, the instruction sequence includes a branch condition. When a "branch loop" instruction is seen by the pre-fetcher, the branch might be predicted as taken, so FPGAs may be preprogrammed. If the branch prediction is incorrect, re-programming an FPGA to accommodate instructions might take several thousand cycles, degrading performance. However, this is not a problem as the FPGA program logic informs the XC instruction to interpret "FPGA1" as a skip to the original TRAD instructions.

Figure 7:
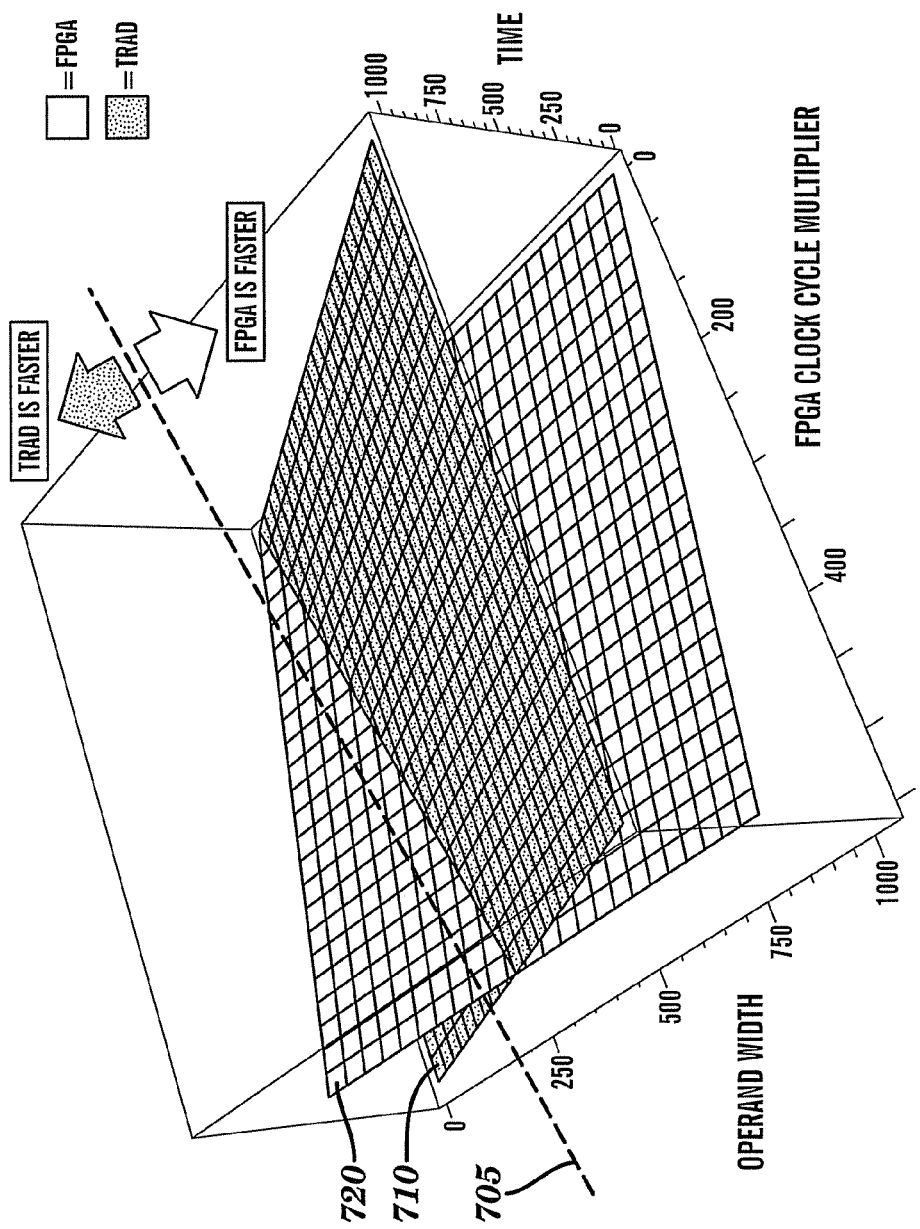
FIG. 7 illustrates how an incorrect branch prediction may be handled according to an exemplary embodiment.

FIG. 7 graphically illustrates a comparison of traditional versus FPGA performance in a string matching example. In FIG. 7, the "x" axis represents time, the "y" axis represents how much slower the FPGA is at executing instructions compared to execution of traditional instructions, and the "z" axis represents string length or width. The graph 710 string length comparison by a processor using traditional instructions, and graph 720 represent strength length comparison by an FPGA. As explained above, an FPGA compares entire strings, while a processor uses traditional instructions to compare one portion of the string at a time. Thus, as shown in FIG. 7, the longer the string length, the longer the time it takes for the processor to compare strings. Conversely, the longer the string length, the shorter the amount of time it takes for the FPGA to compare strings. The FPGA takes constant time for any string length. But the slower the FPGA, the long it takes. For example, an FPGA might take 20 units of time for any length string, while a traditional processor might take a number of units of time equal to the length of the string. The processor is superior for strings shorter than 20 characters, while the FPGA is superior for strings longer than 20 characters. The dashed line 705 represents the string length at which the FPGA performs matching faster.

Figure 8:
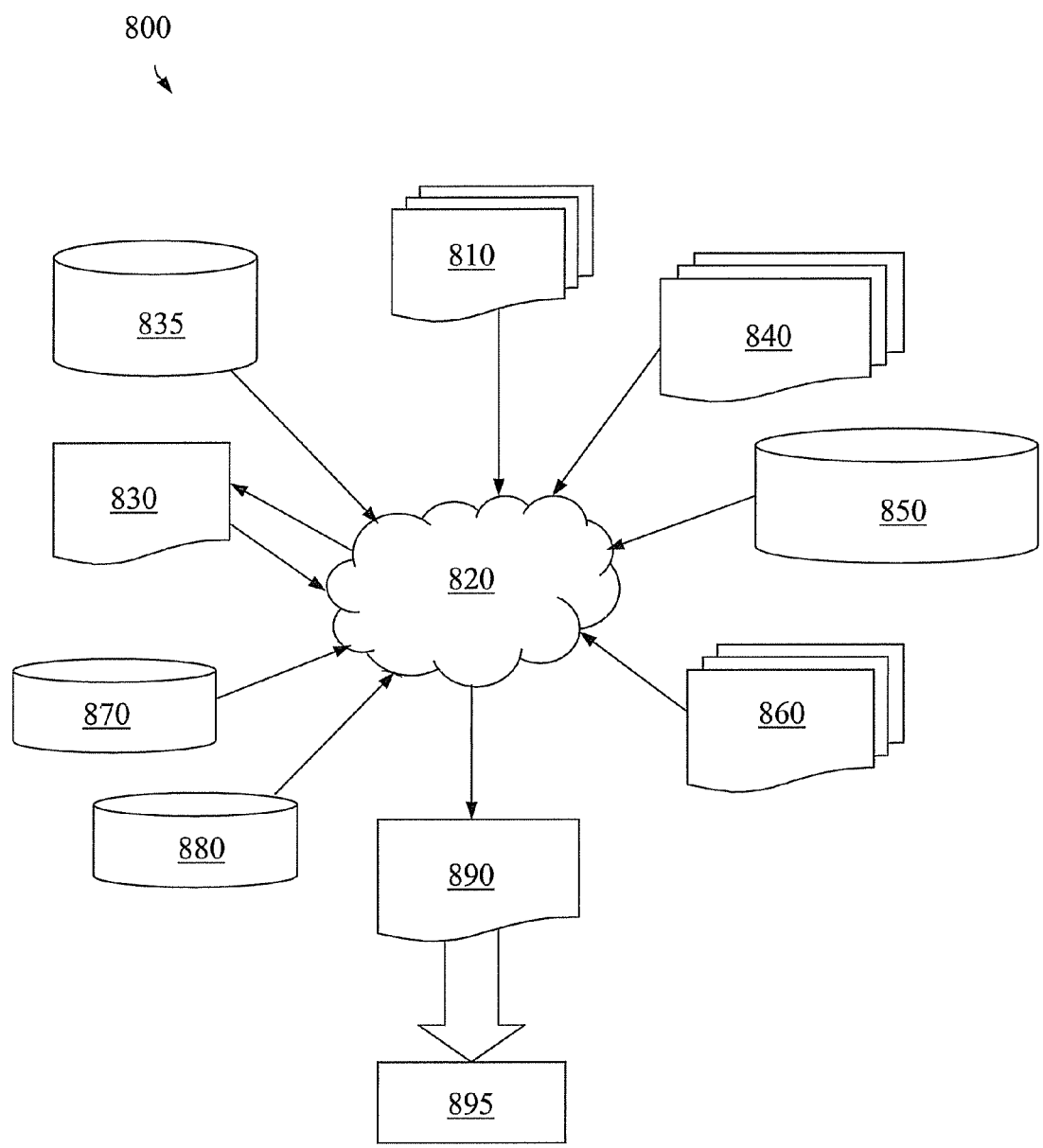
FIG. 8 is a flow diagram of an exemplary design process used in semiconductor design, manufacturing, and/or test.

FIG. 8 is a block diagram illustrating an example of a design flow 800. Design flow 800 may vary depending on the type of IC being designed. For example, a design flow 800 for building an application specific IC (ASIC) will differ from a design flow 800 for designing a standard component. Design structure 810 is preferably an input to a design process 820 and may come from an IP provider, a core developer, or other design company or may be generated by the operator of the design flow, or from other sources. Design structure 810 comprises circuit embodiments (FIG. 2) in the form of schematics or HDL, a hardware-description language, (e.g., Verilog, VHDL, C, etc.). Design structure 810 may be contained on one or more machine readable medium(s). For example, design structure 810 maybe a text file or a graphical representation of circuit embodiments illustrated in FIGS. 1B, 1C. Design process 820 synthesizes (or translates) circuit embodiments (FIG. 2) into a netlist 830, where netlist 830 is, for example, a list of wires, transistors, logic gates, control circuits, I/O, models, etc., and describes the connections to other elements and circuits in an integrated circuit design and recorded on at least one of a machine readable medium. This may be an iterative process in which netlist 830 is resynthesized one or more times depending on design specifications and parameters for the circuit.

Design process 820 includes using a variety of inputs; for example, inputs from library elements 835 which may house a set of commonly used elements, circuits, and devices, including models, layouts, and symbolic representations, for a given manufacturing technology (e.g., different technology nodes, 32 nm, 45 nm, 90 nm, etc.), design specifications 840, characterization data 850, verification data 860, design rules 870, and test data files 880, which may include test patterns and other testing information. Design process 820 further includes, for example, standard circuit design processes such as timing analysis, verification tools, design rule checkers, place and route tools, etc. One of ordinary skill in the art of integrated circuit design can appreciate the extent of possible electronic design automation tools and applications used in design process 820 without deviating from the scope and spirit of the invention. The design structure of the invention embodiments is not limited to any specific design flow.

Design process 820 preferably translates embodiments of the invention as shown in FIG. 2, along with any additional integrated circuit design or data (if applicable), into a second design structure 890. Second design structure 890 resides on a storage medium in a data format used for the exchange of layout data of integrated circuits (e.g. information stored in a GDSII (GDS2), GL1, OASIS, or any other suitable format for storing such design structures). Second design structure 890 may comprise information such as, for example, test data files, design content files, manufacturing data, layout parameters, wires, levels of metal, vias, shapes, data for routing through the manufacturing line, and any other data required by a semiconductor manufacturer to produce embodiments of the invention as shown in FIG. 2. Second design structure 890 may then proceed to a stage 895 where, for example, second design structure 890: proceeds to tape-out, is released to manufacturing, is released to a mask house, is sent to another design house, is sent back to the customer, etc.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A design structure embodied in a non-transitory machine readable medium used in a design process, the design structure comprising:
   a dynamic instruction computer architecture that dynamically selects compiled instructions for execution, the dynamic instruction computer architecture comprising an input for receiving static instructions for execution on a processor and receiving dynamic instructions for execution on a dynamically configurable element;
   wherein the processor evaluates throughput performance of the static instructions and dynamic instructions based on current states of the processor and dynamically configurable element, and selects the static instructions or the dynamic instructions for execution at runtime on the processor or the dynamically configurable element, respectively, based on the throughput performance of the static instructions and dynamic instructions; and
   wherein the design structure comprises a netlist describing the dynamic instruction computer architecture.

2. The design structure of claim 1, wherein the static instructions are based on architecture-dependent instructions.

3. The apparatus of claim 1, wherein the dynamic instructions are based on architecture-independent instructions.

4. The design structure of claim 1, wherein the static instructions are Application Specific Integrated Circuit (ASIC) based instructions, and the dynamic instructions are Field Programmable Gate Array (FPGA) based instructions.

5. The design structure of claim 1, wherein the design structure resides on storage medium as a data format used for the exchange of layout data of integrated circuits.

6. The design structure of claim 1, wherein the design structure includes at least one of test data files, characterization data, verification data, programming data, or design specifications.

* * * * *